United States Patent
Park et al.

(10) Patent No.: US 11,223,055 B2
(45) Date of Patent: Jan. 11, 2022

(54) APPARATUS AND METHOD FOR CONTROLLING FUEL ELECTRODE DRAIN VALVE OF FUEL CELL SYSTEM

(71) Applicants: HYUNDAI MOTOR COMPANY, Seoul (KR); KIA MOTORS CORPORATION, Seoul (KR)

(72) Inventors: Jun Young Park, Suwon-si (KR); Sung Gone Yoon, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/019,787

(22) Filed: Sep. 14, 2020

(65) Prior Publication Data
US 2021/0367249 A1    Nov. 25, 2021

(30) Foreign Application Priority Data
May 21, 2020   (KR) .................. 10-2020-0060847

(51) Int. Cl.
| H01M 8/04 | (2016.01) |
| H01M 8/04223 | (2016.01) |
| H01M 8/0444 | (2016.01) |
| H01M 8/04992 | (2016.01) |
| H01M 8/04746 | (2016.01) |
| H01M 8/04089 | (2016.01) |
| H01M 8/0438 | (2016.01) |

(52) U.S. Cl.
CPC ... *H01M 8/04231* (2013.01); *H01M 8/04089* (2013.01); *H01M 8/04388* (2013.01); *H01M 8/04447* (2013.01); *H01M 8/04753* (2013.01); *H01M 8/04992* (2013.01)

(58) Field of Classification Search
None
See application file for complete search history.

(56) References Cited

U.S. PATENT DOCUMENTS

| 2007/0218327 A1* | 9/2007 | Ishikawa | H01M 8/04089 429/444 |
| 2008/0096059 A1* | 4/2008 | Kanie | H01M 8/04089 429/430 |

* cited by examiner

*Primary Examiner* — Haroon S. Sheikh
(74) *Attorney, Agent, or Firm* — Lempia Summerfield Katz LLC (57) ABSTRACT

An apparatus and a method for controlling a fuel electrode drain valve of a fuel cell system are disclosed. The apparatus includes: a hydrogen sensor that measures the concentration of hydrogen released by opening a fuel electrode drain valve, a first pressure sensor that measures the inlet pressure of the fuel electrode drain valve, a second pressure sensor that measures the outlet pressure of the fuel electrode drain valve; and a controller that controls the opening area of the fuel electrode drain valve to the maximum value when draining the condensate and controls the opening area of the fuel electrode drain valve based on the difference between the inlet pressure and the outlet pressure of the fuel electrode drain valve when purging the hydrogen.

12 Claims, 6 Drawing Sheets

APPARATUS AND METHOD FOR CONTROLLING FUEL ELECTRODE DRAIN VALVE OF FUEL CELL SYSTEM

CROSS-REFERENCE TO RELATED APPLICATION

This application claims priority to and the benefit of Korean Patent Application No. 10-2020-0060847, filed on May 21, 2020, the entire contents of which are incorporated herein by reference.

FIELD

The present disclosure relates to a technology for controlling a fuel electrode drain valve of a fuel cell system.

BACKGROUND

The statements in this section merely provide background information related to the present disclosure and may not constitute prior art.

A fuel cell system is a kind of power generation system that directly converts chemical energy of a fuel to electrical energy by an electro-chemical method in a fuel cell stack without changing the chemical energy to heat by combustion.

To this end, the fuel cell system may include a fuel cell stack that generates electrical energy, a hydrogen supply device that supplies hydrogen fuel into the fuel cell stack, an air supply device that supplies air (oxygen), which is an oxidizing agent for an electro-chemical reaction, to the fuel cell stack, a Thermal Management System (TMS) that releases reaction heat of the fuel cell stack to the outside, controls operating temperature of the fuel cell stack, and performs a water management function, and a control device that controls overall operation of the fuel cell system.

The fuel cell system generates electricity by a reaction of hydrogen fuel with oxygen in air and releases heat and water as reaction by-products.

Meanwhile, in a situation such as a decrease in the concentration of hydrogen, an increase in the concentration of nitrogen, excessive current accumulation, occurrence of stack backward voltage, voltage imbalance, excessive fuel electrode pressure, or the like, the fuel cell system opens a drain valve so as to ensure the concentration of hydrogen in a fuel electrode and control the pressure in the fuel electrode.

When the drain valve is opened, condensate in a water trap located ahead of the drain valve is released, and when the water level of the water trap is lower than or equal to a reference value, the fuel cell system determines that the release of the condensate is completed. Thereafter, the fuel cell system maintains the drain valve in the open state for reference time to allow hydrogen to be purged.

We have discovered that the fuel cell system may not be able to appropriately adjust an opening area of the drain valve in the process of releasing the condensate and purging the hydrogen. Therefore, the fuel cell system may cause a delay in the purging of the hydrogen to lower the durability of the fuel cell stack, or may promote the purging of the hydrogen to make the concentration of hydrogen in exhaust gas exceed a reference value.

The above information disclosed in this Background section is only for enhancement of understanding of the background of the present disclosure and therefore it may contain information that does not form any part of the prior art nor what the prior art may suggest to a person of ordinary skill in the art.

SUMMARY

An aspect of the present disclosure provides an apparatus and method for controlling a fuel electrode drain valve of a fuel cell system, in which the apparatus and method inhibits or prevents degradation in a fuel cell stack and maintains hydrogen concentration in exhaust gas at a reference value or less by allowing hydrogen to be purged at optimal time by controlling an opening area of the drain valve to a maximum value when draining condensate and controlling the opening area of the drain valve based on a difference between inlet pressure and outlet pressure of the drain valve when purging the hydrogen.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for controlling a fuel electrode drain valve of a fuel cell system includes: a hydrogen sensor that measures the concentration of hydrogen released by opening the fuel electrode drain valve, a first pressure sensor that measures inlet pressure of the fuel electrode drain valve, a second pressure sensor that measures outlet pressure of the fuel electrode drain valve; and a controller that controls an opening area of the fuel electrode drain valve to a maximum value when draining condensate and controls the opening area of the fuel electrode drain valve based on a difference between the inlet pressure and the outlet pressure of the fuel electrode drain valve when purging the hydrogen.

In one form of the present disclosure, when the concentration of the hydrogen measured by the hydrogen sensor exceeds a first reference value, the controller starts purging the hydrogen.

In another form of the present disclosure, the controller may control the opening area of the drain valve in a reference range when purging the hydrogen.

In some forms of the present disclosure, the controller may decrease the opening area of the drain valve as the difference between the inlet pressure and the outlet pressure of the drain valve increases.

In some forms of the present disclosure, the controller may control the opening area of the drain valve to a minimum value when the concentration of the hydrogen measured by the hydrogen sensor exceeds a second reference value.

In some forms of the present disclosure, the controller may block the drain valve when a condition for blocking the drain valve is satisfied.

According to another aspect of the present disclosure, a method for controlling a fuel electrode drain valve of a fuel cell system includes: measuring, by a hydrogen sensor, the concentration of hydrogen released by opening the fuel electrode drain valve; measuring, by a first pressure sensor, inlet pressure of the fuel electrode drain valve; measuring, by a second pressure sensor, outlet pressure of the fuel electrode drain valve; controlling, by a controller, an opening area of the fuel electrode drain valve to a maximum value when draining condensate; and controlling, by the controller, the opening area of the fuel electrode drain valve based on a difference between the inlet pressure and the outlet pressure of the fuel electrode drain valve when purging the hydrogen.

In some forms of the present disclosure, the controlling of the opening area of the drain valve may include determining the time when the concentration of the hydrogen exceeds a first reference value to start purging the hydrogen.

In some forms of the present disclosure, the controlling of the opening area of the drain valve may include controlling the opening area of the drain valve in a reference range when purging the hydrogen.

In some forms of the present disclosure, the controlling of the opening area of the drain valve may include decreasing the opening area of the drain valve based on an increase in the difference between the inlet pressure and the outlet pressure of the drain valve.

In some forms of the present disclosure, the controlling of the opening area of the drain valve may include controlling the opening area of the drain valve to a minimum value when the concentration of the hydrogen measured by the hydrogen sensor exceeds a second reference value.

In some forms of the present disclosure, the method may further include blocking the drain valve based on a condition for blocking the drain valve.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing the form of the present disclosure, a detailed description of well-known features or functions will be ruled out in order not to unnecessarily obscure the gist of the present disclosure.

In describing the components of the form according to the present disclosure, terms such as first, second, "A", "B", (a), (b), and the like may be used. These terms are merely intended to distinguish one component from another component, and the terms do not limit the nature, sequence or order of the components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
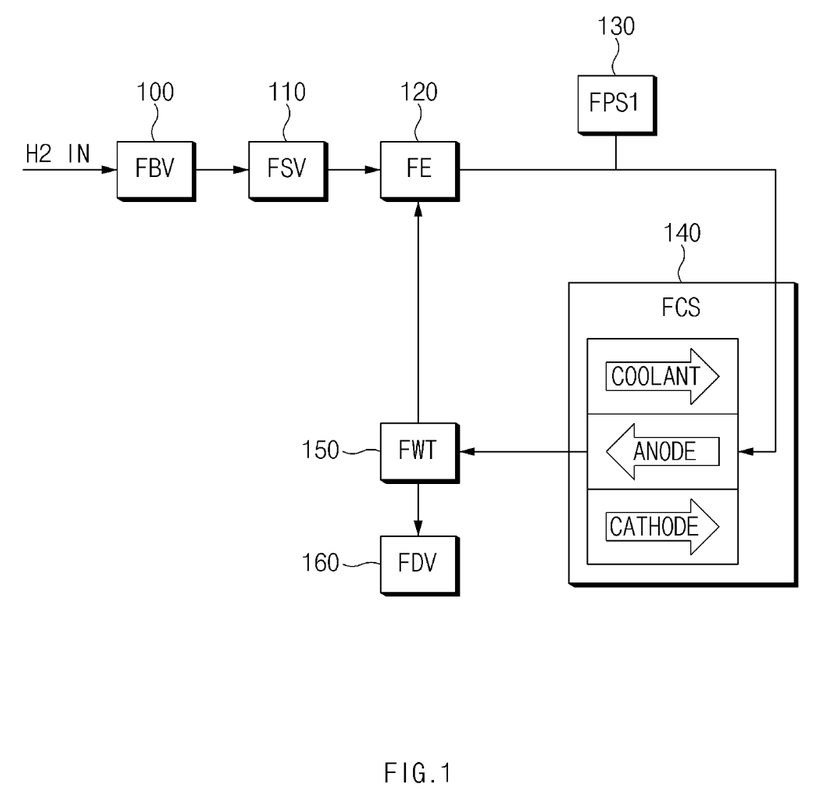
FIG. 1 is an exemplary view illustrating a fuel cell system to which the present disclosure is applied.

FIG. 1 is an exemplary view illustrating a fuel cell system to which the present disclosure is applied.

As illustrated in FIG. 1, the fuel cell system, to which the present disclosure is applied, may include a Fuel Block Valve (FBV) 100, a Fuel Supply Valve (FSV) 110, a Fuel Ejector (FE) 120, a Fuel Pressure Sensor 1 (FPS1) 130, a Fuel Cell Stack (FCS) 140, a Fuel line Water Trap (FWT) 150, a Fuel line Drain Valve (FDV) 160, and the like.

The FBV 100 blocks hydrogen that is supplied into the fuel cell stack 140.

The FSV 110 adjusts the pressure of the hydrogen that is supplied into the fuel cell stack 140.

The FE 120 supplies the hydrogen into the fuel cell stack 140 by applying pressure to the hydrogen.

The FPS1 130, as a first pressure sensor, measures the pressure of the hydrogen that is supplied into the fuel cell stack 140. That is, the FPS1 130 measures inlet pressure of the FDV 160.

The fuel cell stack 140 produces electricity using a chemical reaction of the hydrogen with oxygen.

The FWT 150 stores condensate of a fuel electrode.

The FDV 160, as a fuel electrode drain valve, purges the hydrogen in the fuel cell stack 140 as well as draining the condensate (water) stored in the FWT 150. The drain valve 160 may be implemented with a solenoid valve.

Figure 2:
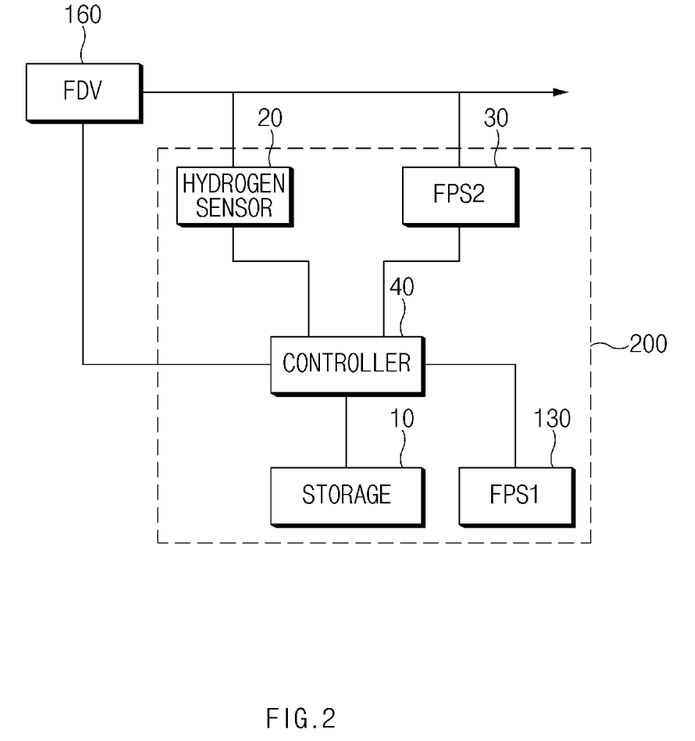
FIG. 2 is a view illustrating a configuration of an apparatus for controlling a fuel electrode drain valve of the fuel cell system in one form of the present disclosure.

FIG. 2 is a view illustrating a configuration of an apparatus for controlling the fuel electrode drain valve of the fuel cell system according to one form of the present disclosure.

As illustrated in FIG. 2, the fuel electrode drain valve control apparatus 200 of the fuel cell system may include storage 10, a hydrogen sensor 20, the FPS1 130, an FPS2 30, and a controller 40. Depending on a way of carrying out the fuel electrode drain valve control apparatus 200 of the fuel cell system according to the form of the present disclosure, the components may be combined together to form one entity or some of the components may be omitted.

The storage 10 may store various logics, algorithms, and programs required for a process of determining the time to start purging hydrogen based on the concentration of hydrogen at an outlet of the drain valve 160 that is measured by the hydrogen sensor 20, controlling the opening area of the drain valve 160 to a maximum value when draining condensate, and adjusting the opening area of the drain valve 160 based on a difference between inlet pressure and outlet pressure of the drain valve 160 when purging the hydrogen.

The storage 10 may store a first reference value (e.g., 1% to 2%) as a hydrogen concentration used to determine the time to start purging the hydrogen and may store a second reference value (e.g., 3% to 4%) as a second hydrogen concentration for controlling the opening area of the drain valve 160 to a minimum value.

The storage 10 may include at least one type of storage medium among memories of a flash memory type, a hard disk type, a micro type, and a card type (e.g., a Secure Digital (SD) card or an eXtream Digital (XD) card) and memories of a Random Access Memory (RAM) type, a Static RAM (SRAM) type, a Read-Only Memory (ROM) type, a Programmable ROM (PROM) type, an Electrically Erasable PROM (EEPROM) type, a Magnetic RAM (MRAM) type, a magnetic disk type, and an optical disk type.

The hydrogen sensor 20 may be located at the outlet of the drain valve 160 and may measure the concentration of hydrogen released as the drain valve 160 is opened.

The FPS2 30, which is a second pressure sensor, may be located at the outlet of the drain valve 160 and may measure the outlet pressure of the drain valve 160.

The controller 40 performs overall control to allow the components to normally perform functions thereof. The controller 40 may be implemented in the form of hardware or software, or in a combination thereof. The controller 40 may be implemented with, but is not limited to, a microprocessor.

In particular, the controller 40 may perform various controls in the process of determining the time to start purging the hydrogen based on the concentration of hydrogen at the outlet of the drain valve 160 that is measured by the hydrogen sensor 20, controlling the opening area of the drain valve 160 to the maximum value when draining the condensate, and adjusting the opening area of the drain valve 160 based on the difference between the inlet pressure and the outlet pressure of the drain valve 160 when purging the hydrogen.

The controller 40 may open the drain valve 160 when a specific condition is satisfied. That is, the controller 40 may open the drain valve 160 in a situation such as a decrease in the concentration of hydrogen in the fuel cell stack 140, an increase in the concentration of nitrogen in the fuel cell stack 140, excessive current accumulation, occurrence of backward voltage in the fuel cell stack 140, voltage imbalance, excessive fuel electrode pressure, or the like. The conditions for opening the drain valve 160 are well-known and common technologies, and in opening the drain valve 160, any one of the conditions may be used.

The controller 40, when opening the drain valve 160, may control the opening area of the drain valve 160 to the maximum value to allow the condensate in the FWT 150 to be rapidly drained.

The controller 40, when opening the drain valve 160, may determine the time to start purging the hydrogen based on the concentration of hydrogen measured by the hydrogen sensor 20. That is, in a case where the concentration of hydrogen measured by the hydrogen sensor 20 when the drain valve 160 is opened exceeds the first reference value, the controller 40 may determine that the condensate is completely drained and the hydrogen starts to be purged.

The controller 40, when purging the hydrogen, may adjust the opening area of the drain valve 160 based on the difference between the inlet pressure of the drain valve 160 measured by the FPS1 130 and the outlet pressure of the drain valve 160 measured by the FPS2 30.

Hereinafter, a process of adjusting, by the controller 40, the opening area of the drain valve 160 will be described with reference to FIG. 3.

Figure 3:
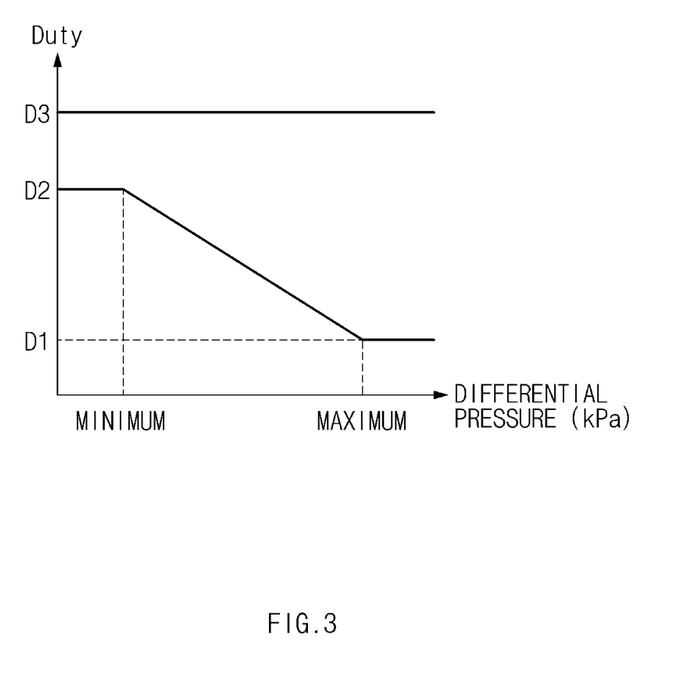
FIG. 3 is a view illustrating a process in which a controller included in the fuel electrode drain valve control apparatus of the fuel cell system adjusts the opening area of the drain valve according to one form of the present disclosure.

FIG. 3 is a view illustrating a process in which the controller included in the fuel electrode drain valve control apparatus of the fuel cell system adjusts the opening area of the drain valve according to one form of the present disclosure.

In FIG. 3, the vertical axis represents duty corresponding to the opening degree of the drain valve 160, and the horizontal axis represents a difference between inlet pressure and outlet pressure of the drain valve 160.

As illustrated in FIG. 3, when opening the drain valve 160, the controller 40 may control the opening area of the drain valve 160 to a maximum value D3 to allow the condensate in the FWT 150 to be rapidly drained.

The controller 40, when purging hydrogen, may adjust the opening area of the drain valve 160 in a reference range of D1 to D2, based on the difference (hereinafter, referred to as the differential pressure) between the inlet pressure of the drain valve 160 measured by the FPS1 130 and the outlet pressure of the drain valve 160 measured by the FPS2 30. At this time, the controller 40 may perform control such that the opening area of the drain valve 160 is decreased as the differential pressure of the drain valve 160 is increased. This is for reducing the amount of hydrogen released. Furthermore, the controller 40 may perform control such that the opening area of the drain valve 160 is increased as the differential pressure of the drain valve 160 is decreased. This is for inhibiting or preventing a delay in purging the hydrogen.

When the concentration of hydrogen measured by the hydrogen sensor 20 in a process of adjusting the opening area of the drain valve 160 exceeds the second reference value, the controller 40 controls the opening area of the drain valve 160 to a minimum value D1 to reduce or minimize the amount of hydrogen released. Even when the opening area of the drain valve 160 is controlled to the minimum value D1, it does not mean that the drain valve 160 is in a completely closed state.

Meanwhile, the controller 40 may block the drain valve 160 when a condition for blocking the drain valve 160 is satisfied. Here, the condition for blocking the drain valve 160 is a well-known and common technology, and in blocking the drain valve 160, any method may be used.

Figure 4:
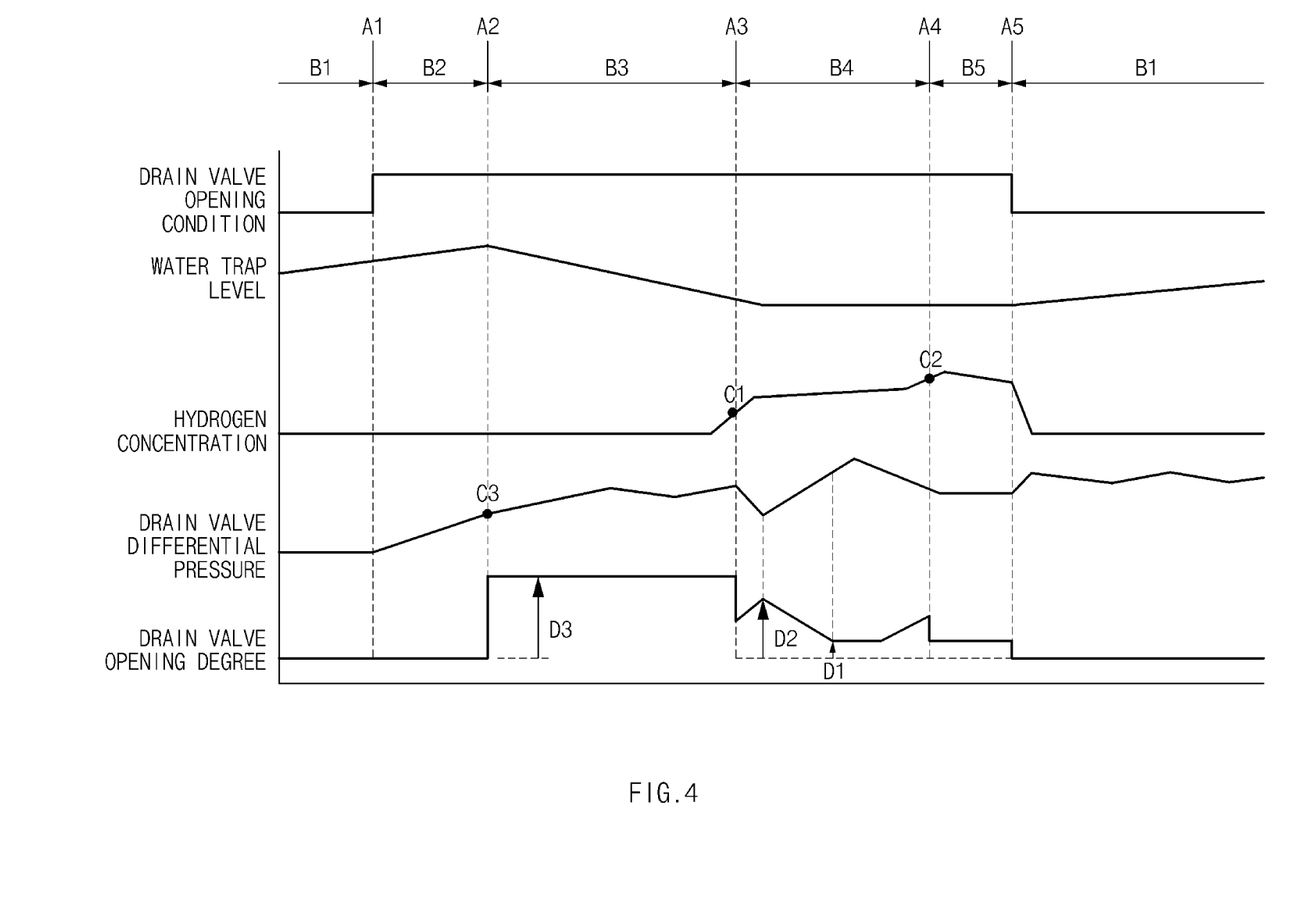
FIG. 4 is a view illustrating a process in which the controller included in the fuel electrode drain valve control apparatus of the fuel cell system adjusts the opening area of the drain valve according to one form of the present disclosure.

FIG. 4 is a view illustrating a process in which the controller included in the fuel electrode drain valve control apparatus of the fuel cell system adjusts the opening area of the drain valve in one form of the present disclosure.

In FIG. 4, "A1" represents the time when a condition for opening the drain valve 160 is satisfied, "A2" represents the time when the drain valve 160 is opened, "A3" represents the time to start purging hydrogen, "A4" represents the time when the concentration of hydrogen measured by the hydrogen sensor 20 located at the outlet of the drain valve 160 exceeds the second reference value, and "A5" represents the time when the drain valve 160 is blocked.

In FIG. 4, "B1" represents a normal operation interval, "B2" represents an interval in which the pressure of the fuel electrode is increased, "B3" represents an interval in which the opening area of the drain valve 160 is controlled to the maximum value "D3", "B4" represents an interval in which the opening area of the drain valve 160 is adjusted in the reference range of "D1" to "D2" based on the differential pressure of the drain valve 160, and "B5" represents an interval in which the concentration of hydrogen released from the outlet of the drain valve 160 exceeds the second reference value and the opening area of the drain valve 160 is controlled to the minimum value "D1".

Referring to FIG. 4, "C1" represents the first reference value, "C2" represents the second reference value, "C3" represents the minimum differential pressure of the drain valve 160 as a condition for opening the drain valve 160, "D3" represents the maximum opening degree of the drain valve 160 when the condensate is drained, "D2" represents the maximum opening degree of the drain valve 160 when the hydrogen is purged, and "D1" represents the minimum opening degree of the drain valve 160 when the hydrogen is purged.

Figure 5:
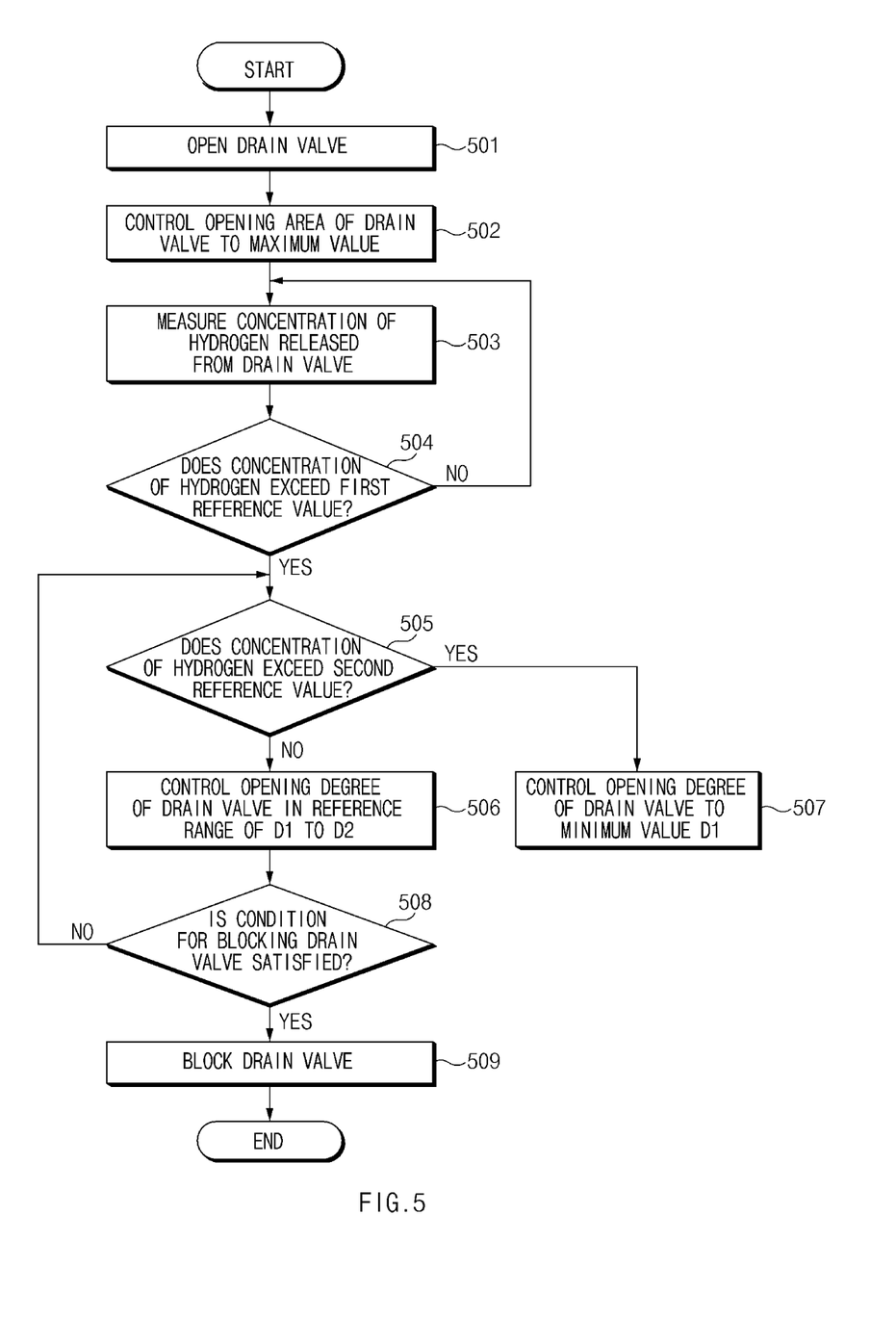
FIG. 5 is a flowchart illustrating a method for controlling the fuel electrode drain valve of the fuel cell system according to an form of the present disclosure.

FIG. 5 is a flowchart illustrating a method for controlling the fuel electrode drain valve of the fuel cell system according to an form of the present disclosure.

The controller 40 opens the drain valve 160 (501). At this time, the controller 40 may open the drain valve 160 in a case where a condition for opening the drain valve 160 is satisfied, and the opening condition is not a subject matter of the present disclosure.

The controller 40 controls the opening area of the drain valve 160 to a maximum value (502).

The hydrogen sensor 20 measures the concentration of hydrogen released from the drain valve 160 (503). At this time, the hydrogen sensor 20 may periodically measure the concentration of hydrogen.

The controller 40 determines whether the concentration of hydrogen measured by the hydrogen sensor 20 exceeds the first reference value (504).

When it is determined that the concentration of hydrogen does not exceed the first reference value (504), the controller 40 proceeds to process "503".

When it is determined that the concentration of hydrogen exceeds the first reference value (504), the controller 40 recognizes that hydrogen starts to be purged and determines whether the concentration of hydrogen exceeds the second reference value (505).

When it is determined that the concentration of hydrogen does not exceed the second reference value (505), the controller 40 controls the opening degree of the drain valve 160 in the reference range of D1 to D2, based on the difference (differential pressure) between the inlet pressure and the outlet pressure of the drain valve 160 (506). At this time, the controller 40 may perform control such that the opening area of the drain valve 160 is increased as the differential pressure of the drain valve 160 is decreased.

When it is determined that the concentration of hydrogen exceeds the second reference value (505), the controller 40 controls the opening area of the drain valve 160 to the minimum value D1 (507).

The controller 40 determines whether a condition for blocking the drain valve 160 is satisfied (508).

When it is determined that the condition for blocking the drain valve 160 is not satisfied (508), the controller 40 proceeds to process "505", and when the condition for blocking the drain valve 160 is satisfied, the controller 40 blocks the drain valve 160.

Figure 6:
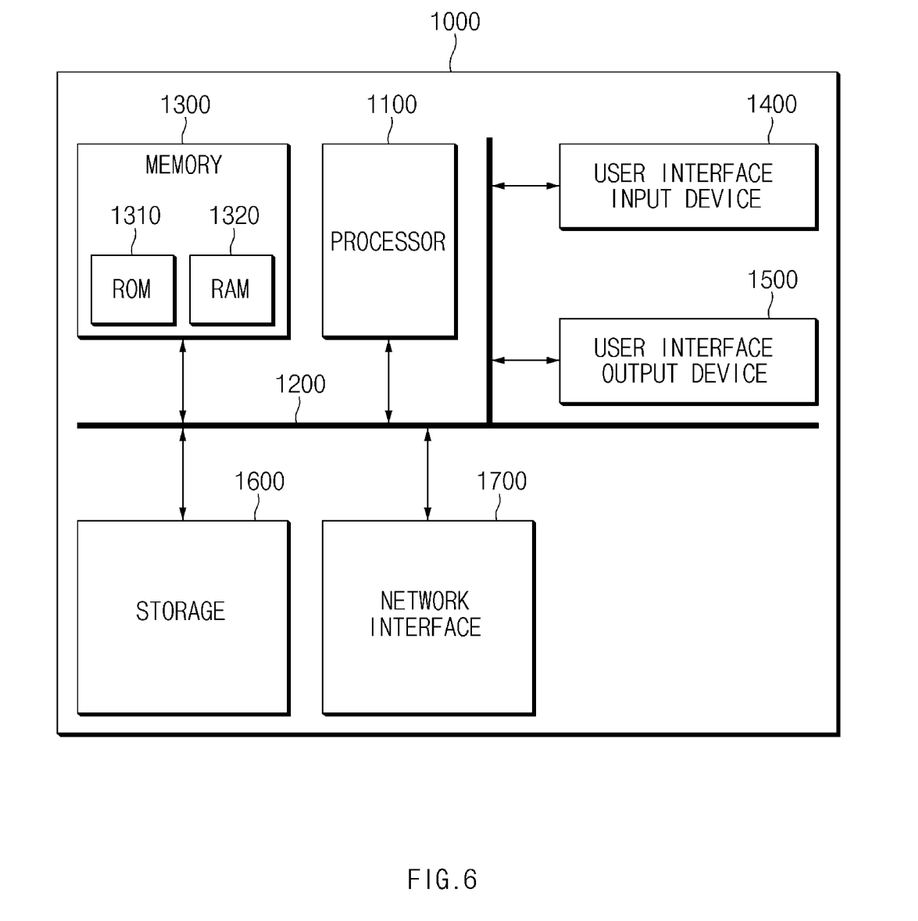
FIG. 6 is a block diagram illustrating a computing system for executing the method for controlling the fuel electrode drain valve of the fuel cell system according to an form of the present disclosure.

FIG. 6 is a block diagram illustrating a computing system for executing the method for controlling the fuel electrode drain valve of the fuel cell system according to one form of the present disclosure.

Referring to FIG. 6, the method for controlling the fuel electrode drain valve of the fuel cell system may be implemented through the computing system. The computing system 1000 may include at least one processor 1100, a memory 1300, a user interface input device 1400, a user interface output device 1500, storage 1600, and a network interface 1700, which are connected with each other via a system bus 1200.

The processor 1100 may be a Central Processing Unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the forms disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, or a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an Application Specific Integrated Circuit (ASIC). The ASIC may reside within a user terminal. In another case, the processor 1100 and the storage medium may reside in the user terminal as separate components.

As described above, according to the forms of the present disclosure, the apparatus and method for controlling the fuel electrode drain valve of the fuel cell system controls the opening area of the drain valve to the maximum value when draining the condensate and controls the opening area of the drain valve based on the difference between the inlet pressure and the outlet pressure of the drain valve when purging the hydrogen, thereby enabling the hydrogen to be purged at optimal time, which in turn prevents degradation in the fuel cell stack and maintains hydrogen concentration in exhaust gas at the reference value or less.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

Therefore, the exemplary forms of the present disclosure are provided to explain the spirit and scope of the present disclosure, but not to limit them, so that the spirit and scope of the present disclosure is not limited by the forms. The scope of the present disclosure should be construed on the basis of the accompanying claims, and all the technical ideas within the scope equivalent to the claims should be included in the scope of the present disclosure.

What is claimed is:

1. An apparatus for controlling a fuel electrode drain valve of a fuel cell system, the apparatus comprising:
   a hydrogen sensor configured to measure a concentration of hydrogen released by opening the fuel electrode drain valve;
   a first pressure sensor configured to measure an inlet pressure of the fuel electrode drain valve;

a second pressure sensor configured to measure an outlet pressure of the fuel electrode drain valve; and a controller configured to: control an opening area of the fuel electrode drain valve to a maximum value when draining condensate, and control the opening area of the fuel electrode drain valve based on a difference between the inlet pressure and the outlet pressure of the fuel electrode drain valve when purging the hydrogen.

2. The apparatus of claim 1, wherein when the concentration of the hydrogen measured by the hydrogen sensor exceeds a first reference value, the controller is configured to start purging the hydrogen.

3. The apparatus of claim 1, wherein the controller is configured to control the opening area of the fuel electrode drain valve in a reference range when purging the hydrogen.

4. The apparatus of claim 1, wherein the controller is configured to decrease the opening area of the fuel electrode drain valve as the difference between the inlet pressure and the outlet pressure of the fuel electrode drain valve increases.

5. The apparatus of claim 1, wherein when the concentration of the hydrogen measured by the hydrogen sensor exceeds a second reference value, the controller is configured to control the opening area of the fuel electrode drain valve to a minimum value.

6. The apparatus of claim 1, wherein when a condition for blocking the fuel electrode drain valve is satisfied, the controller is configured to block the fuel electrode drain valve.

7. A method for controlling a fuel electrode drain valve of a fuel cell system, the method comprising:

measuring, by a hydrogen sensor, a concentration of hydrogen released by opening the fuel electrode drain valve;

measuring, by a first pressure sensor, an inlet pressure of the fuel electrode drain valve;

measuring, by a second pressure sensor, an outlet pressure of the fuel electrode drain valve;

controlling, by a controller, an opening area of the fuel electrode drain valve to a maximum value when draining condensate; and controlling, by the controller, the opening area of the fuel electrode drain valve based on a difference between the inlet pressure and the outlet pressure of the fuel electrode drain valve when purging the hydrogen.

8. The method of claim 7, wherein controlling the opening area of the fuel electrode drain valve includes:

determining a time when the concentration of the hydrogen exceeds a first reference value to start purging the hydrogen.

9. The method of claim 7, wherein controlling the opening area of the fuel electrode drain valve includes:

controlling the opening area of the fuel electrode drain valve in a reference range when purging the hydrogen.

10. The method of claim 7, wherein controlling the opening area of the fuel electrode drain valve includes:

decreasing the opening area of the fuel electrode drain valve based on an increase in the difference between the inlet pressure and the outlet pressure of the fuel electrode drain valve.

11. The method of claim 7, wherein controlling the opening area of the fuel electrode drain valve includes:

when the concentration of the hydrogen measured by the hydrogen sensor exceeds a second reference value, controlling the opening area of the fuel electrode drain valve to a minimum value.

12. The method of claim 7, further comprising:

blocking, by the controller, the fuel electrode drain valve based on a condition for blocking the fuel electrode drain valve.

* * * * *